United States Patent [19]

Akaiwa

[11] Patent Number: 5,097,484
[45] Date of Patent: Mar. 17, 1992

[54] DIVERSITY TRANSMISSION AND RECEPTION METHOD AND EQUIPMENT

[75] Inventor: Yoshihiko Akaiwa, Fukuoka, Japan

[73] Assignee: Sumitomo Electric Industries, Ltd., Osaka, Japan

[21] Appl. No.: 417,559

[22] Filed: Oct. 5, 1989

[30] Foreign Application Priority Data

Oct. 12, 1988 [JP] Japan .................. 63-256602
Oct. 12, 1988 [JP] Japan .................. 63-256603
May 31, 1989 [JP] Japan .................. 1-138010

[51] Int. Cl.$^5$ .................. H04B 7/02; H04B 7/08
[52] U.S. Cl. .................. 375/40; 455/133; 455/134; 455/135; 455/101; 455/103
[58] Field of Search .................. 375/40; 455/132, 133, 455/134, 135, 136, 272, 101, 103, 53, 54, 33

[56] References Cited

U.S. PATENT DOCUMENTS

| | | | |
|---|---|---|---|
| 3,365,666 | 1/1968 | Reynders et al. | 455/135 |
| 3,375,516 | 3/1968 | Hart et al. | 455/134 |
| 4,317,218 | 2/1982 | Perry | 455/133 |
| 4,383,332 | 5/1983 | Glance et al. | 455/33 |
| 4,513,412 | 4/1985 | Cox | 455/134 |
| 4,769,825 | 9/1988 | Vogel | 375/40 |
| 4,953,197 | 8/1990 | Kaewell, Jr. et al. | 455/135 |

FOREIGN PATENT DOCUMENTS

1-73927 7/1989 Japan .................. 455/135

Primary Examiner—Douglas W. Olms
Assistant Examiner—Ralph Smith
Attorney, Agent, or Firm—Lane, Aitken & McCann

[57] ABSTRACT

In an antenna-selection diversity transmission and reception equipment which is in digital communication with a transmission and reception equipment having a single antenna, and performs transmission and reception with time division by using the same radio frequencies, the antenna-selection diversity transmission and reception equipment comprises a plurality of antennae, a receiving part having a receiving unit, comparing unit and selecting unit which are adapted for a receiving-antenna selection diversity, and a transmitting part having a memory unit for storing antenna information that was selected by the receiving part. An antenna for transmission is selected from the plurality of antennae at the time of transmission in accordance with the information of the memory unit.

7 Claims, 7 Drawing Sheets

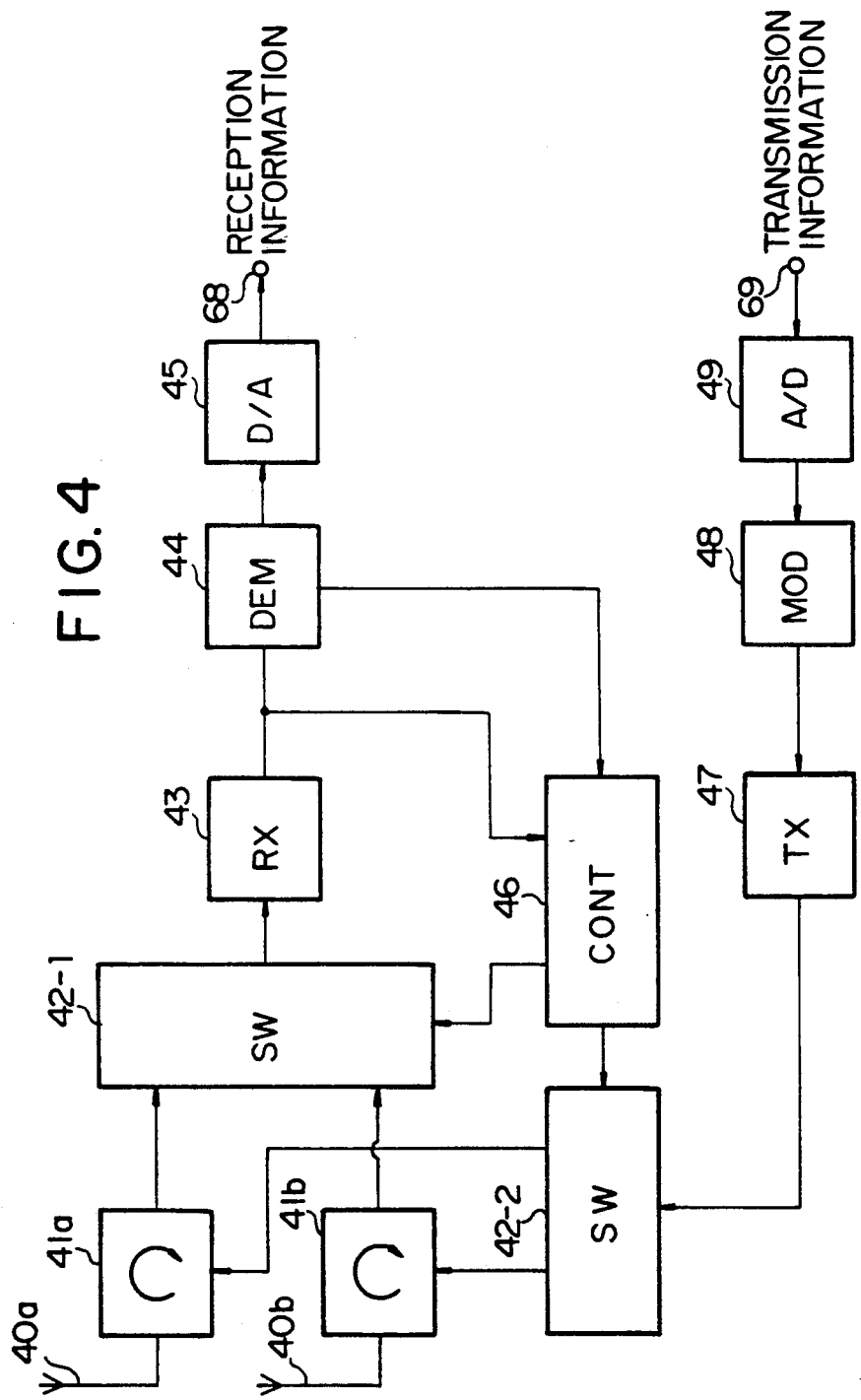

SIGNAL OF DOWN DIRECTION (BS→MS)

SIGNAL OF UP DIRECTION (MS→BS)

DIVERSITY TRANSMISSION AND RECEPTION METHOD AND EQUIPMENT

FIELD OF THE INVENTION

The present invention relates in general to diversity transmission and reception method and equipment that use a plurality of antennae, and in particular to diversity transmission and reception method and equipment which are suited to communicate digital signals between a fixed station with a plurality of antennae and a mobile station with a single antenna.

DESCRIPTION OF THE PRIOR ART

In mobile communications, fading causes the fluctuation of reception level and therefore deterioration in the communications. As a method of reducing the fading, a diversity reception has been widely performed. In that case, a method is normally used which employs a plurality of antennae spaced apart from one another. For example, there is known a method wherein two antennae are spaced apart from each other so that the densities of signals received to the antennae are not correlated, the reception levels of the two antennae are measured at all times, and an antenna of higher signal level is selected.

If signals received to two antennae are not correlated, a probability that the signal levels become lower together with the both signals is then greatly reduced, and consequently deterioration of the received signals becomes few.

Various kinds of diversity reception methods are also known and described, for example, in "Jakes edited, Microwave Mobile Communications, John Wiley and Sons."

In the case that a mobile transmission and reception equipment of small size is required like a cordless telephone and a portable telephone, space diversity could not be adopted in the radio in the mobile side, because it is difficult to install a plurality of antennae.

Accordingly, it is an object of the present invention to provide an improved diversity transmission and reception equipment which is capable of eliminating the need for using a plurality of antennae in a mobile transmission and reception equipment, being easily made a small size, and overcoming fading.

Another object is to provide an improved diversity transmission and reception method which is capable of eliminating the need for using a plurality of antennae in a mobile transmission and reception equipment, being easily made a small size, and overcoming fading.

SUMMARY OF THE INVENTION

According to one important aspect of the present invention, in an antenna-selection diversity transmission and reception equipment which is in digital communication with a transmission and reception equipment having a single antenna, and performs transmission and reception with time division by using the same radio frequencies, the antenna-selection diversity transmission and reception equipment comprises a plurality of antennae; a receiving part having receiving means, comparing means and selecting means which are adapted for a receiving-antenna selection diversity; and a transmitting part having memory means for storing antenna information that was selected by the receiving part; an antenna for transmission being selected from the plurality of antennae at the time of transmission in accordance with the information of the memory means.

A digital signal to be transmitted may be constituted by at least a preamble signal and an information signal, and the antenna selection of reception diversity may be performed by the selecting means that is driven when the preamble signal is received.

The antenna-selection diversity transmission and reception equipment may be provided in a base station, and the transmission and reception equipment having a single antenna may be provided in a mobile station.

In accordance with another important aspect of the present invention, there is provided a diversity transmission and reception equipment which performs digital communications with a transmission and reception equipment having a plurality of antennae and transmitting a frame signal including at least a first signal interval which is transmitted from one antenna selected from the plurality of antennae and a second signal interval which is transmitted with time division from the plurality of antennae in a predetermined sequence, comprising: a single antenna for receiving the frame signal; a receiving part for receiving each of signals of the second signal interval transmitted from the plurality of antennae and received to the single antenna, the receiving part having level comparing means for detecting a signal of highest level from the received signals of the second signal interval and transmitting the signal of highest level as a selection control signal; and a transmitting part having a selection-control-signal transmitting part to which the selection control signal is inputted, the selection control signal being transmitted through the single antenna to the transmission and reception equipment having a plurality of antennae.

According to yet another important aspect of the present invention in a diversity transmission and reception method wherein digital communications are performed between one transmission and reception equipment having a plurality of antennae and another transmission and reception equipment having a single antenna, the diversity transmission and reception method comprises transmitting a frame signal from the one transmission and reception equipment, the frame signal including at least a first signal interval which is transmitted from one antenna selected from the plurality of antennae and a second signal interval which is transmitted with time division from the plurality of antennae in a predetermined sequence; discriminating signals of the second signal interval of the frame signal transmitted from the one transmission and reception equipment, by the another transmission and reception equipment, and transmitting an optically received signal information as a selection control signal from the another transmission and reception equipment; selecting an antenna for reception from the plurality of antennae of the one transmission and reception equipment by diversity antenna selection, and selecting an antenna for transmission from the plurality of antennae of the one transmission and reception equipment by reception of the selection control signal transmitted from the another transmission and reception equipment.

BRIEF DESCRIPTION OF THE DRAWINGS

The above and other objects and advantages will become apparent from the following detailed description when read in conjunction with the accompanying drawings wherein:

FIG. 4 is a block diagram of a second embodiment of the present invention;

DESCRIPTION OF THE PREFERRED EMBODIMENTS

Figure 1:
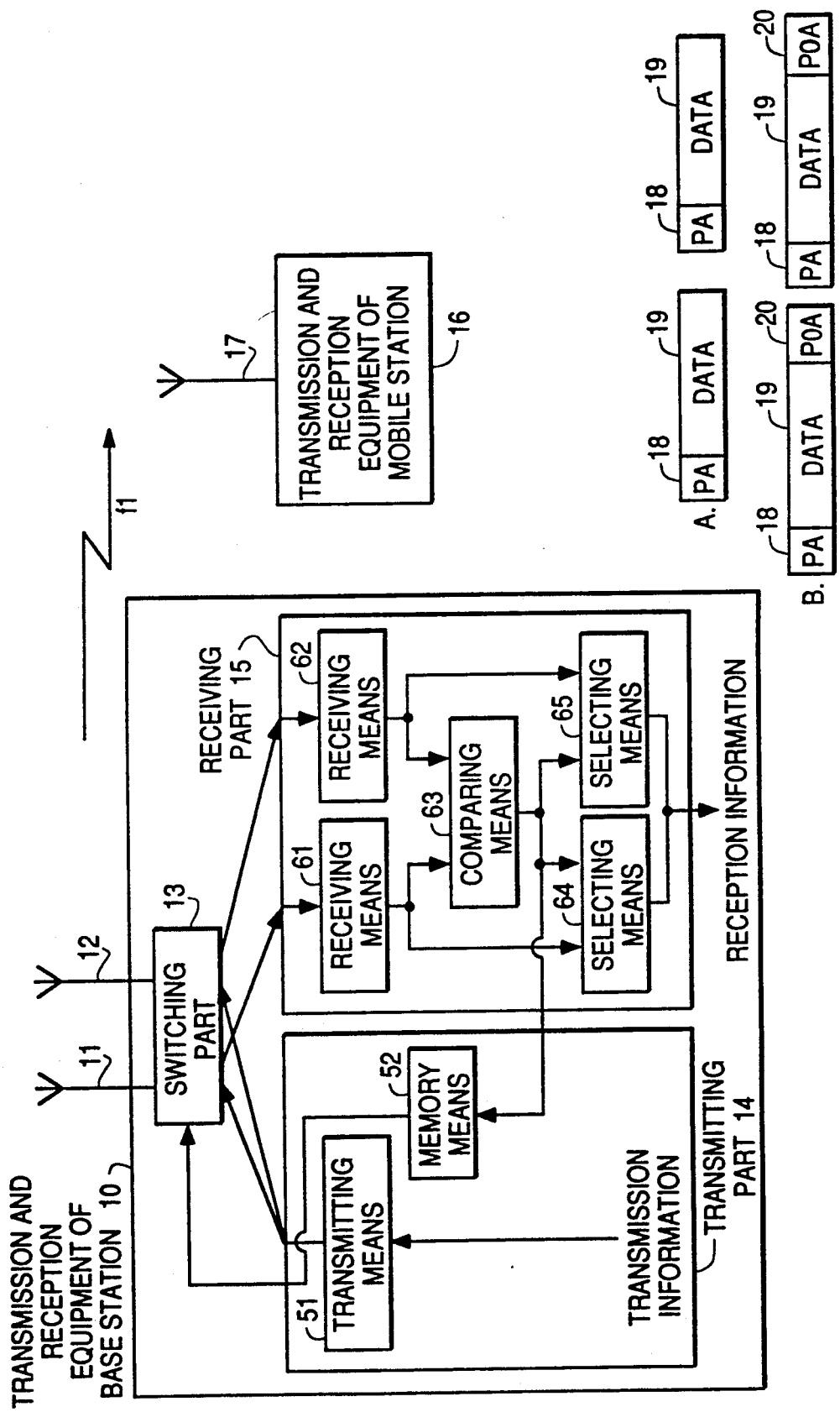
FIG. 1 is a schematic block diagram showing the principle of the present invention which is applied to the embodiments of FIGS. 3A and 4.

FIG. 1 of the accompanying drawings schematically illustrates the principle of the present invention. In FIG. 1, a transmission and reception equipment of a base station indicated by reference numeral 10 has a plurality of antennae 11 and 12, a switching part 13, a transmitting part 14, and a receiving part 15. A transmission and reception equipment 16 of a mobile station has a single antenna 17.

In the transmission and reception between the base and mobile stations shown in FIG. 1, the same radio frequency f1 is used, the transmission and the reception are not performed at the same time in the same transmission and reception equipment, and the transmission (up direction) to the base station from the mobile base station and the transmission (down direction) to the mobile station from the base station are performed at different time intervals.

The format of signals to be transmitted is a like frame signal in both the directions of the up direction (from mobile station to base station) and the down direction (from base station to mobile station).

The present invention can employ either of the two signal formats in A and B shown on the right side of FIG. 1. The frame signal of the format A is constituted by a preamble signal 18 (indicated by PA) and an information signal 19 (indicated by DATA). The length of the frame signal is set so that it becomes shorter than the cycle of fading. The frame signal of the format B is constituted by a preamble signal 18 (indicated by PA), an information signal 19 (indicated by DATA) and a postamble signal 20 (indicated by POA), and is a signal format wherein the postamble signal is further added to the frame signal of the format A. Likewise, the length of the frame signal of the format B is set so that it becomes shorter than the cycle of fading.

In the case that, with the use of the signal format A, signals are received in the transmission and reception equipment 10 of the base station, the preamble signals 18 are received by the antennae 11 and 12 and transmitted through the switching part 13 to receiving means 61 and 62 of the receiving part 15, respectively, in which the respective signal levels are detected. The detected signal levels are compared in comparing means 63, and the result is supplied as a reception-selection control signal to selecting means 64 and 65. As a result, among the signals received from the two antennae 11 and 12, the information signal obtained from the antenna that is higher in signal level is used as a reception signal. At this time, the comparison result in the comparing means 63 is stored in memory means 52 of the transmitting part 14.

Although in FIG. 1 two receiving means 61 and 62 are provided for the purpose of explaining the principle of the present invention, the reception-selection control signal can be obtained by using one receiving means with time division, switching the received signals of the antennae 11 and 12 and detecting them (during the interval of preamble signal), and comparing the respective received levels (the previously received level has been stored).

In the case that the transmission from the base (fixed) station is performed, a transmission signal from transmitting means 51 of the transmitting part 14 is transmitted through the switching part 13 from one of the antennae 11 and 12. In that case, since the above described reception-selection control signal produced from the comparing means 63 of the receiving part 15 is stored in advance in the memory means 52 of the transmitting part 14, the switching part 13 performs switching operation at the time of transmission in accordance with the reception-selection control signal, and an antenna selected 11 or 12 is used as an antenna for transmission.

In the case that the signal from the mobile station is received with the use of the signal format B, the selection control for receiving the information signal by reception of the preamble signals 18 and comparison of the received signal levels at that time is the same as the case of the signal format A.

If the postamble signal 20 is received following the information signal 19, the postamble signal 20 is then detected by the selecting means (64 or 65) of the receiving part 15 that was selected by the preamble signal 18. By this, the comparison of the signal levels received in the receiving means 61 and 62 of the receiving part 15 is performed by the comparing means 63. This comparing operation is performed in the same way as the above comparison of the preamble signal 18, and information representing an antenna of higher signal level is stored as the comparison result in the memory means 52. In the case that the signal format B was employed, the switching part 13 is switched at the time of transmission by the information stored in the memory means 52 and representing an antenna of higher signal level at the time of the postamble signal 20 reception, and transmission is performed from the antenna of higher signal level.

Figure 2A:
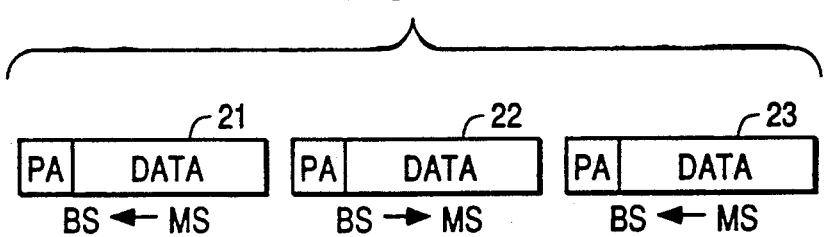
FIGS. 2A and 2B schematically illustrate the transmission sequence of signal formats according to the embodiments of FIGS. 3A and 4.
Figure 2B:
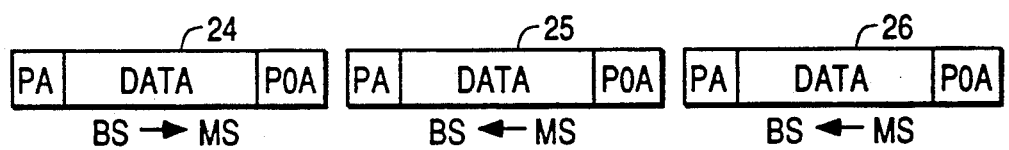
Figure 3A:
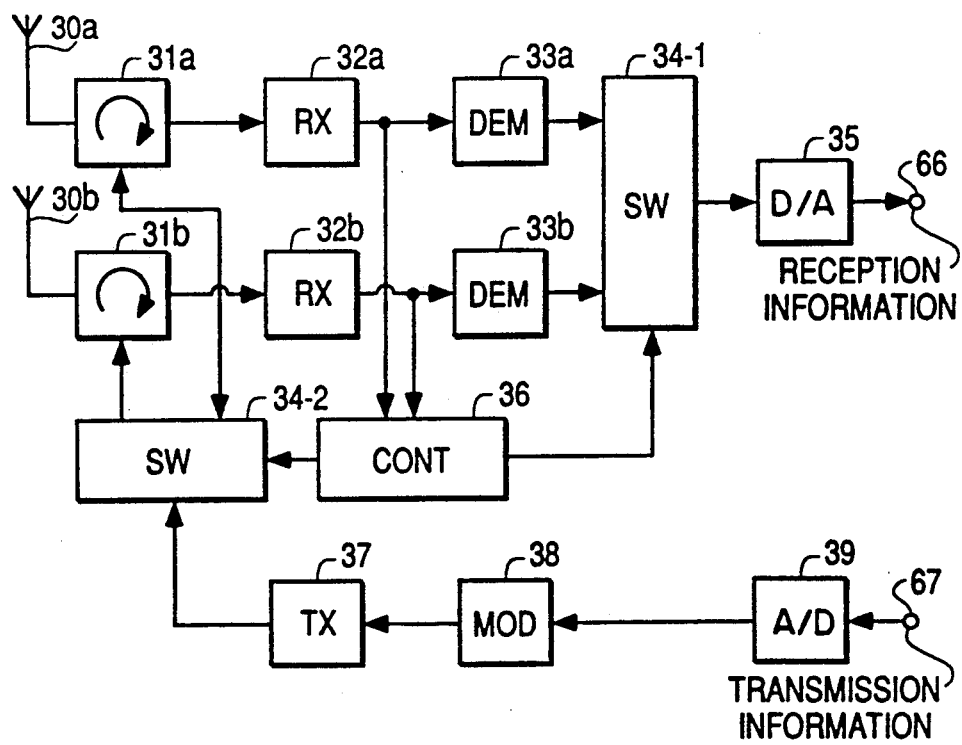
FIG. 3A is a block diagram of a first embodiment of the present invention.
Figure 3B:
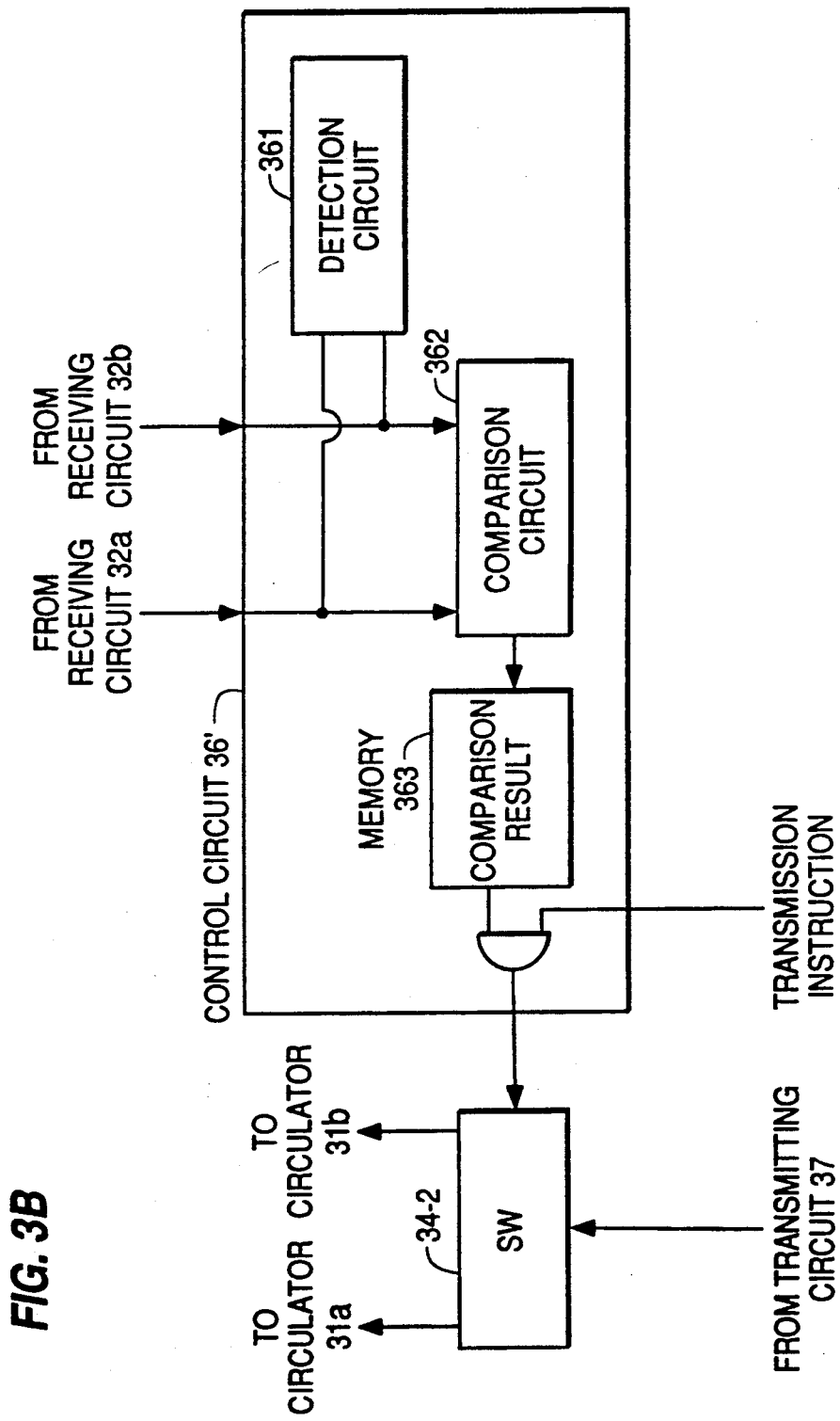
FIG. 3B is a block diagram of a control circuit in which a postamble signal may be used.

FIG. 2A and 2B illustrate the transmission sequence of signal formats according to the present invention. FIG. 3A is a schematic block diagram of a first embodiment of the present invention, and FIG. 3B is a block diagram of a control circuit in the case that a postamble signal is used. FIG. 4 is a schematic block diagram of a second embodiment of the present invention. Embodiments to be described hereinafter are applied to a digital transmission system that performs the communication between a base station and a mobile station, for example, a cordless telephone system.

FIG. 2A shows the transmission sequence by the frame signal constituted by a preamble signal (PA) and an information signal (DATA), while FIG. 2B shows the transmission sequence by the frame signal constituted by a preamble signal (PA), an information signal (DATA) and a postamble signal (POA).

In FIGS. 2A and 2B, reference numerals 21, 23 and 24, 26 are frame signals of the up direction from a mobile station (indicated by MS) to a base station (indicated by BS), respectively, and 22, 25 are frame signals of the down direction from the base station to the mobile station, and communications are alternately performed between the base and mobile stations. An information signal (indicated by DATA) of the frame signal is a data signal, or digitized signal of a voice signal.

The length of a signal transmitted at a time, that is, the length of the frame signal is set so that it becomes sufficiently shorter than the fading cycle resulting from the movement of the mobile station and the like. Consequently, the intensity of received signals does not vary during transmission of one frame signal, and a case is few where diversity effect to be described hereinafter is reduced.

Even in the case of a voice signal, by digitizing it once, the voice signal can be easily made a frame signal. It is considered that, in the case of a cordless telephone, a voice coding speed is in the order of 32 Kbit/s because of ADPCM (Adaptive Delta Pulse Code Modulation) system. A transmission speed in radio channels is in the order of 70 Kbit/s, in view of up and down communications, and further the preamble signal portion. If a frame length is in the order of 300 bit, it is considered that the frame length is sufficiently shorter as compared to the fading cycle, since transmission of one signal is completed for 5 milliseconds.

FIG. 3A illustrates the first embodiment of the present invention. An output terminal 66 and an input terminal 67 of the transmission and reception equipment of the base station of FIG. 3A are connected to a wire (not shown). Antennae 30a and 30b are spaced apart from each other, and consequently signals received to the antennae 30a and 30b are not correlated.

The receiving operation will be described hereinafter. In the case that the frame signals 21 and 23 of the format of FIG. 2A are received from the mobile station, the signals that were received to the antennae 30a and 30b are inputted through circulators 31a and 31b to receiving circuits 32a and 32b (indicated by RX and RX), respectively, wherein frequency conversion, band limit and amplification are performed. Outputs of the receiving circuits 32a and 32b are inputted demodulation circuits 33a and 33b (indicated by DEM and DEM), respectively, and also portions of the outputs are inputted to a control circuit 36 (indicated by CONT). The demodulation circuits 33a and 33b each perform the demodulation and interpretation of digital signals, and the parsing of frame signals.

The control circuit 36 measures the output signal levels of the receiving circuits 32a and 32b and performs the comparison therebetween. As a result of the comparison, a control signal that selects a demodulation circuit connected to a signal branch higher in signal level, is outputted to a switching circuit 34-1 (indicated by SW). The output of the demodulation circuit selected is inputted to a digital/analog conversion circuit 35 (indicated by D/A), which outputs a received analog voice signal to the output terminal 66.

It will be clear from the foregoing description that, in the transmission and reception equipment of the base station of the first embodiment of FIG. 3A, after detection, a selection diversity reception is performed.

The signal branch that has been selected by the control circuit 36 is stored immediately before completion of the receiving operation, and used in the selection of a transmitting antenna in a transmitting operation to be described hereinafter.

In the transmitting operation, an analog voice signal inputted to the input terminal 67 is converted into a digital signal by an analog/digital converter 39 (indicated by A/D). This digital signal is formed into a frame signal, together with a preamble signal, and then modulated by a modulator 38 (indicated by MOD). The modulated wave signal is inputted to a transmitting circuit 37 (indicated by TX) that performs frequency conversion and amplification, and to a switching circuit 34-2.

As described previously, the control circuit 36 has stored the signal branch that was selected at reception immediately before transmission, and outputs a control signal to the switching circuit 34-2 for selecting an antenna belonging to the selected signal branch. It is here assumed that, for the sake of convenience, the signal branch including the antenna 30b has been selected. At this time, the transmission signal is outputted by the switching circuit 34-2 to the circulator 31b, which transmits it through the antenna 30b.

FIG. 3B shows a control circuit in the case that the postamble signal was used.

In the case that the format of FIG. 2B was used, the selection of a demodulation circuit by reception of the preamble signal is performed in reception, and the reception of the information signal (DATA) is done by the structure of FIG. 3B, as in the case of the above described format A. If the postamble signal (POA) is received following the information signal (DATA), this signal is detected at a control circuit 36' of FIG. 3B.

That is, if the postamble signal is detected at a detection circuit 361 of the control circuit 36', the outputs of the two receiving circuits 32a and 32b are compared at a comparison circuit 362, information representing the output of higher signal level is stored as a comparison result in a memory 363.

In the case of transmitting from this base station, the information stored in the memory 363 of the control circuit 36' at the time of the above described postamble signal reception is outputted by a transmission instruction. That information is inputted to the switching circuit 34-2 of FIG. 3A to select a corresponding antenna.

Thus, if the postamble signal is used, since an antenna is selected by receiving the postamble signal added to the end of the frame that the mobile station (MS) transmitted immediately before the transmission from the base station, the selection can be more accurately performed as compared with the selection by the preamble signal.

Since radio frequencies are the same in transmission and reception, if a signal is transmitted from the antenna of the signal branch selected upon reception, the transmission to the mobile station from the base station then has a transmission diversity effect because of the reversibility of transmission and reception. Since in the embodiment of FIG. 3A the signal frame length is sufficiently shorter than the cycle of fading, even if the selection of antennae is fixed to the antenna selected prior to transmission, a reduction in the diversity effect caused by this can be neglected.

FIG. 4 shows the second embodiment of the present invention. In the case that the frame signal of the format of FIG. 2A is used, since the transmitting operation is the same as that of the first embodiment of FIG. 3A, a description of this part will not be given.

In the receiving operation, if a control circuit 46 receives a preamble signal by monitoring an output signal of a demodulation circuit 44, the control circuit 46 measures the signal level of an output signal of a receiving circuit 43 only for a predetermined time interval (preferably, about half of a preamble signal time). The control circuit 46 also stores the value of the signal level, along with a signal branch that has been selected.

Next, the control circuit 46 outputs a switching signal to a switching circuit 42-1 to select the other signal, and measures the signal level in a similar way. The value of the received level is also stored along with a signal branch that has been selected. The values of the signal levels stored are then compared, and a control signal that selects a signal branch having a larger value is outputted to a switching circuit 42-2, which holds the signal branch.

The second embodiment has its advantages in that, in addition to structural simplicity of the receiving circuit 43, the switching of antennae can be performed in the interval of the preamble signal. Consequently, this embodiment is advantageous in signal error characteristics, since switching noises occurring at the time of antenna switching do not occur in the information signal portion of the frame signal.

The transmission and reception of the frame signal of the format shown in FIG. 2B will now be described with reference to the structure of FIG. 4.

The receiving operation of the preamble signal and information signal is the same as that of the format shown in FIG. 2A. In the reception of the postamble signal, if the reception of the postamble signal is started, the signal level of the output of the receiving circuit 34 is measured only for a predetermined time interval (about half of the postamble signal time), and a signal branch that has been selected is stored together with the value of the measured signal level. If the predetermined time interval passes, the switching circuit 42-1 is switched and the received level of the other antenna is measured, and a signal branch that has been selected is stored with the value of the measured level. The values of the signal levels stored are then compared, and a signal that represents a signal branch of higher signal level is stored.

In the case of transmitting after the reception, the signal that represents a signal branch of higher signal level is outputted to the switching circuit 42-2, and the transmission is performed through a corresponding antenna.

Figure 5:
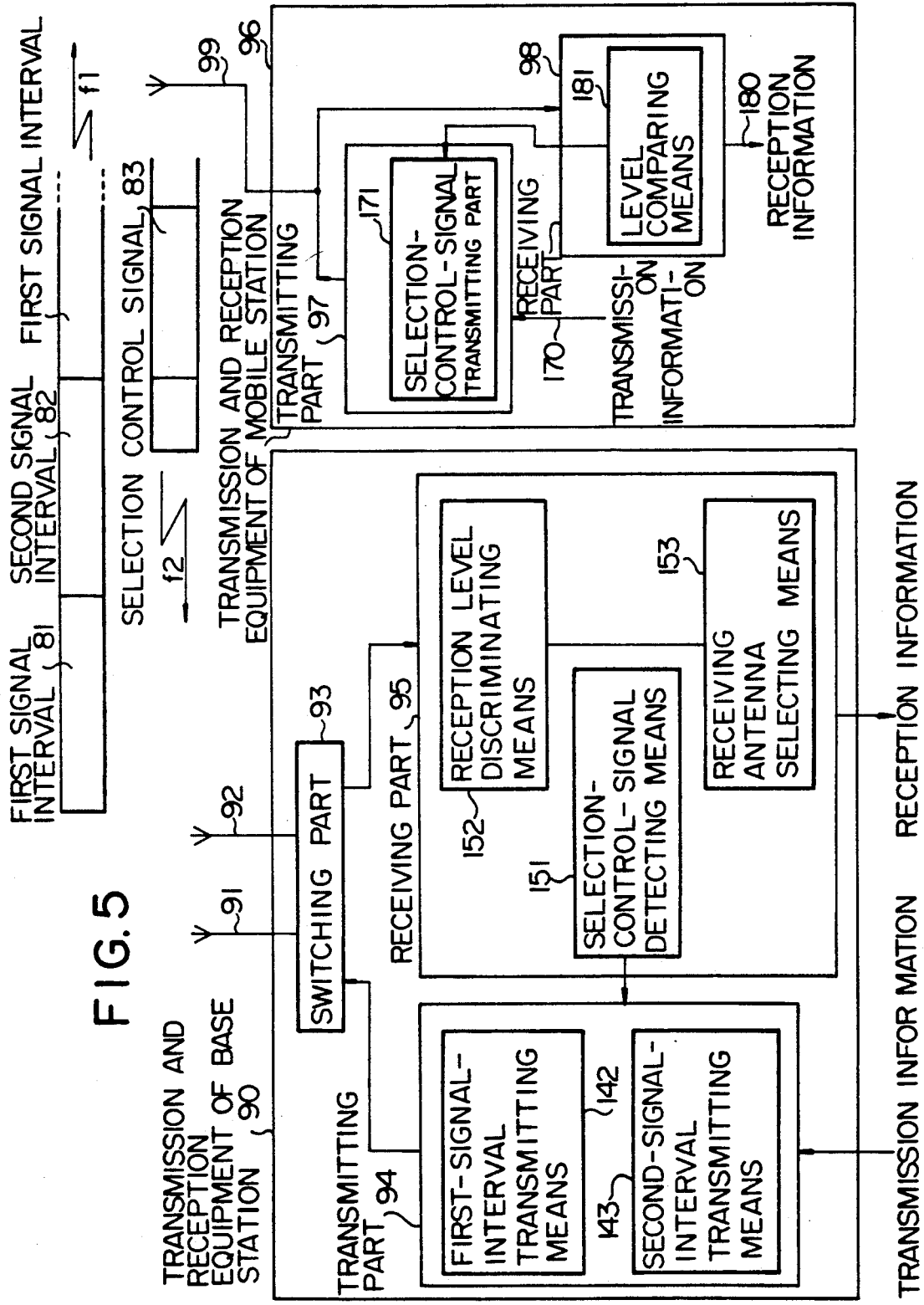
FIG. 5 is a schematic block diagram showing the principle of the present invention which is applied to the embodiments of FIGS. 7 and 8.
Figure 7:
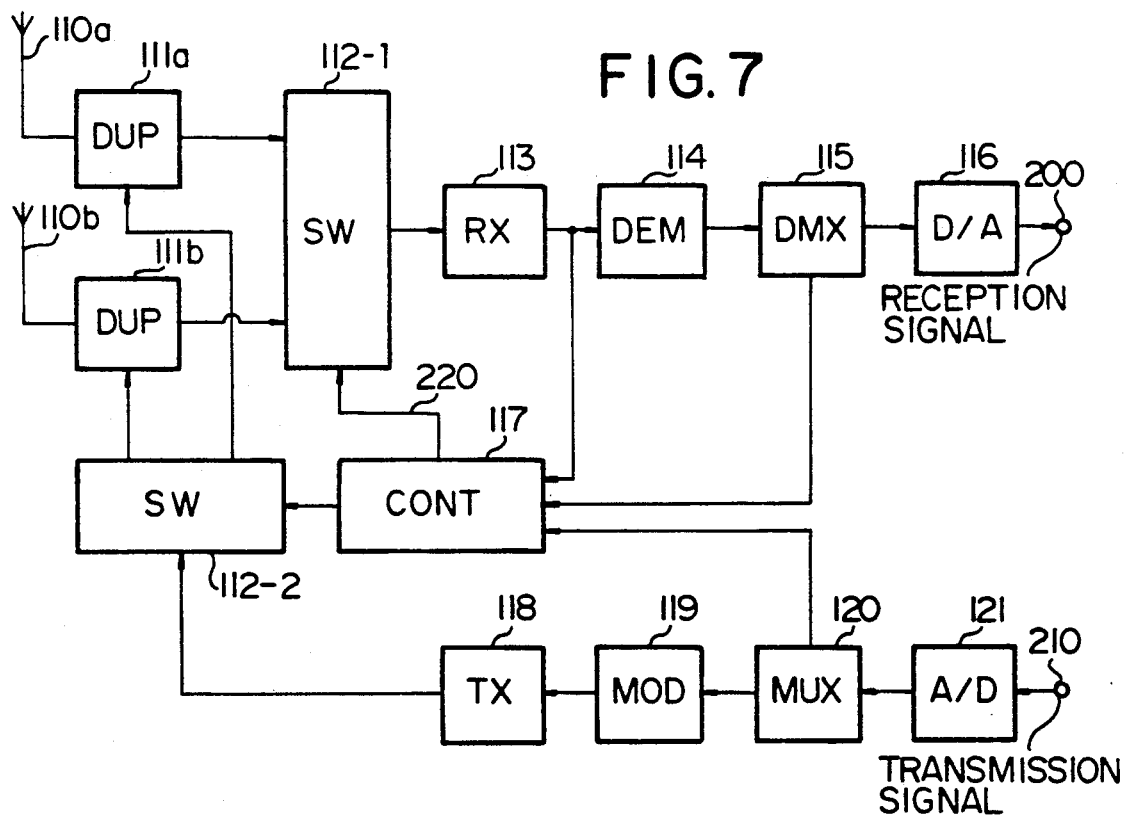
FIG. 7 is a block diagram of the embodiment of a transmission and reception equipment of a base station, which is constructed in accordance with the principle of FIG. 5.
Figure 8:
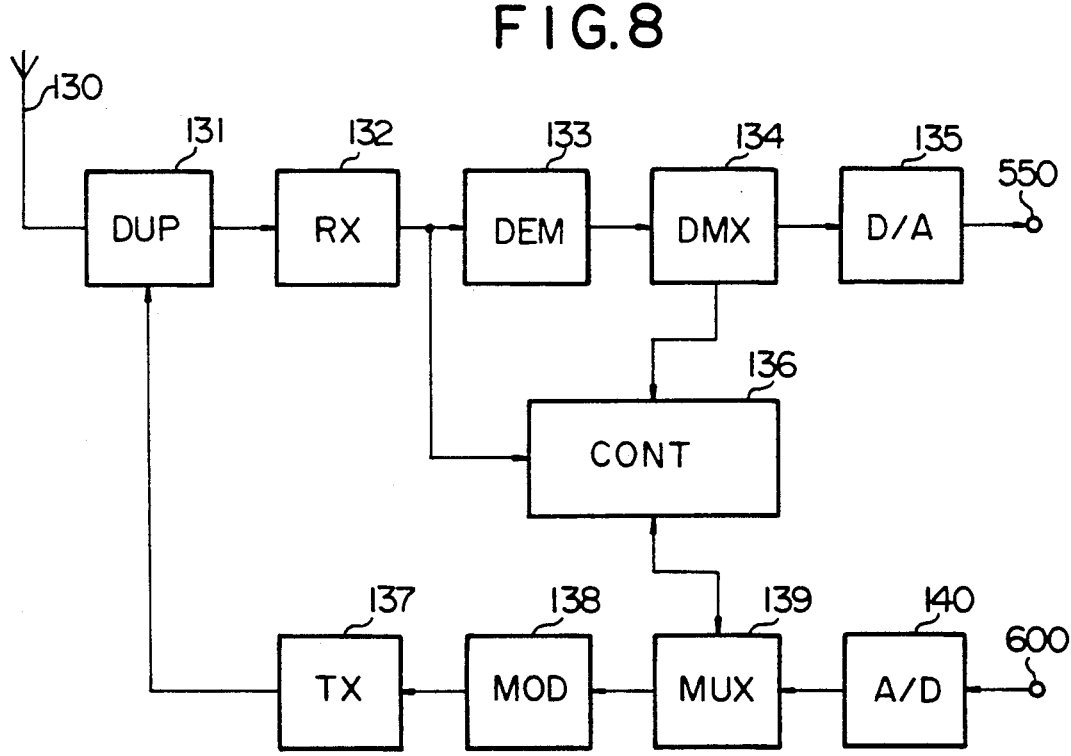
FIG. 8 is a block diagram of the embodiment of a transmission and reception equipment of a mobile station, which is constructed in accordance with the principle of FIG. 5.

FIG. 5 schematically shows the principle of the present invention which is applied to the embodiments of FIGS. 7 and 8. In FIG. 5, a transmission and reception equipment provided in a base station (fixed station) indicated by reference numeral 90 comprises a plurality of antennae 91 and 92, a switching part 93, a transmitting part 94, and a receiving part 95. A transmission and reception equipment 96 (another transmission and reception equipment) provided in a mobile station comprises a single antenna 99, a transmitting part 97, and a receiving part 98.

In the communications between the base and mobile stations shown in FIG. 5, the transmission (down direction) to the mobile station from the base station is performed by a radio frequency f1, the transmission (up direction) to the base station from the mobile station is performed by a radio frequency f2 (different from f1), and the communications in both the directions can be performed at the same time.

As shown on the upper portion of FIG. 5, a transmission signal in the down direction is a frame signal that includes a first signal interval 81 and a second signal interval 82. The first signal interval 81 is transmitted from one transmitting antenna 91 or 92, while the second signal interval 82 is time divided and transmitted in sequence one by one from a plurality of antennae 91 and 92. As shown similarly on the upper portion of FIG. 5, a transmission signal in the up direction is a frame signal that includes at least a selection control signal 83.

The signal transmitted from the transmission and reception equipment 96 of the mobile station is received in the antennae 91 and 92 of the transmission and reception equipment 90 of the base station. The outputs of the two antennae 91 and 92 are inputted to the receiving part 95, and compared and discriminated in reception-level discriminating means 152. If the reception-level discriminating means 152 detects a higher reception level, it then outputs an indicating signal to receiving-antenna selecting means 153, which selects one of the outputs of the receiving antennae 91 and 92 and selects and controls an antenna output from which an information signal (data signal or digitalized analog signal) is picked out. When this occurs, in the receiving part 95, the selection control signal 83 included in the received signal is detected and supplied to the transmitting part 94 by selection-control-signal detecting means 151.

In the transmitting part 94, first-signal-interval transmitting means 142 controls the switching of the switching part 93 in such a manner that transmission information is transmitted at the first signal interval 81, and that the first signal of the first signal interval 81 is transmitted from the antenna that has been assigned by the selection control signal 83 detected in the selection-control-signal detecting means 151 of the receiving part 95. Second-signal-interval transmitting means 143 also controls the switching of the switching part 93 in such a manner that the second signal of the second signal interval 82 is time shared and transmitted in sequence from a plurality of the antennae 91 and 92.

The transmission and reception equipment 96 of the mobile station receives the transmission signals from the base station. It can be considered that the first signal of the first signal interval 81 among that transmission signals is one which is transmitted from the antenna that is selected by the selection control signal 83 transmitted from the mobile station immediately before the reception, and which has a signal level over a certain degree. In the receiving part 98 of the mobile station, reception information 180 included in the signal of the first signal interval 81 is picked out.

If the time-shared signals of the second signal interval 82 are received following the first signal of the first signal interval 81, they are then stored, and when all the second signals are received, the values thereof are compared and discriminated in level comparing means 181. When a signal of highest level is discriminated, it is transmitted as a selection control signal from selectioncontrol-signal transmitting part 171, together with transmission information 170.

As described above, the transmission signals from the base station can be always received satisfactorily in the mobile station by receiving, in the transmission and reception equipment 96 of the mobile station, the signals of the second signal interval 82 transmitted from a plurality of the antennae 91 and 92 of the base station, discriminating which signal can be received satisfactorily, and transmitting the result to the base station.

Figure 6A:
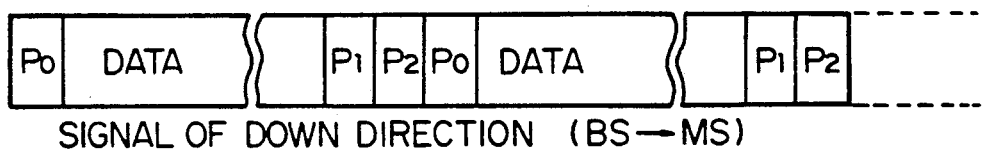
FIG. 6A shows a signal format of down direction (from base station to mobile station) which is used in the embodiments of FIGS. 7 and 8.

FIG. 6A shows a signal format of down direction (from base station to mobile station) where Po indicates a preamble signal, DATA an information signal to be transmitted and a data signal or a digital signal into which an analog voice is converted, and P1 and P2 postamble signals. The signals are transmitted as a frame signal. The frame length is selected to be sufficiently shorter than the cycle of fading resulting from movement of the mobile station. In FIG. 6A, BS indicates a base station, and MS a mobile station.

The preamble signal Po and the information signal DATA are the signal of the first signal interval 81 shown in FIG. 5, while the postamble signals P1 and P2 are separated from each other and transmitted individually from two antennae and are the signals of the second signal interval 82 shown in FIG. 5.

Figure 6B:
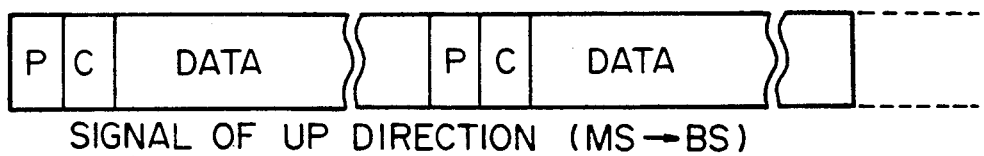
FIG. 6B shows a signal format of up direction (from mobile station to base station) which is used in the embodiments of FIGS. 7 and 8.

FIG. 6B shows a signal format of up direction (from mobile station to base station) where P indicates a preamble signal, C a selection control signal, and DATA an information signal.

FIG. 7 is a block diagram of an embodiment of a transmission and reception equipment of a base station according to the present invention. In FIG. 7, reception signal and transmission signal are connected to a wire (for example, telephone switched network). The frame signal shown in FIG. 6A is transmitted from the base station. If the length of the frame signal is set so that it becomes shorter than the cycle of fading, the intensity of reception signal will do not vary during transmission of one frame signal, and a case will be few where diversity effect to be described hereinafter is reduced.

In the transmission of up direction (from MS to BS), antenna-selection diversity reception is performed using antennae 110a and 110b of the base station. In the transmission of down direction (from BS to MS), the signal interval of the information signal is selected depending upon a signal that was transmitted from the mobile station by the previous transmission of up direction. In the signal interval of the postamble signals P1 and P2 that are transmitted from either one of the antennae and divided into two, the signal P1 is transmitted from one antenna and the signal P2 from the other antenna.

The antennae 110a and 110b are spaced apart from each other, and therefore the signals received to these antennae are substantially not correlated. The signals that were received to the antennae 110a and 110b are respectively inputted through antenna shared units 111a and 111b (indicated by DUP and DUP) to a switching circuit 112-1 (indicated by SW). The switching circuit 112-1 selects one of the two input signals in response to a control signal 220 outputted from a control circuit 117 (indicated by CONT), and outputs it to a receiving circuit 113 (indicated by RX). This operation will hereinafter be described in detail.

In the receiving circuit 113, operations such as frequency conversion, band limit and amplification are performed. A portion of the output of the receiving circuit 113 is inputted to a demodulating circuit 114 (indicated by DEM), wherein processing such as demodulation interpretation of digital signals is performed. The output of the demodulating circuit 114 is inputted to a demultiplexer 115 (indicated by DEM), wherein it is parsed into the preamble signal P, information signal DATA and antenna-selection control signal C. The information signal DATA is inputted to a digital/analog converter 116 (indicated by D/A), which outputs a received analog signal to an output terminal 200.

The operation of the control circuit 117 at the time of reception is performed as follows. If the frame signal shown in FIG. 6B is transmitted from the mobile station, a portion of the output signal of the receiving circuit 113 of the base station is then inputted to the control circuit 117. If, by monitoring the output signal level of the receiving circuit 113, it is found that the reception of the preamble signal P was started, the control circuit 117 then measures the received level only for a predetermined time, for example, for a period of half time of the preamble signal P.

After elapse of that time, the route including a receiving antenna that has been selected at that time and the measured signal level are stored. Thereafter, by switching the control signal 220, a signal that switches the selected route is outputted to the switching circuit 112-1.

If the switching of the switching circuit 112-1 is completed, the output signal level of the receiving circuit 113 is then measured. If a predetermined time passes and the measurement of the signal level is completed, the route and the measured signal level are then stored. This signal level is compared with the previously measured signal level, and a control signal is outputted to the switching circuit 112-1 to select a route corresponding to the higher signal level. Thereafter, by monitoring the output signal of the demultiplexer 115, the above operation is repeated each time the preamble signal P is received.

As will be understood from the foregoing description, the base station of the present invention performs antenna-selection diversity reception.

The received antenna-selection control signal C has been outputted from the demultiplexer 117 to the control signal 117 and stored. As will be described hereinafter, this control signal C is used in the antenna selection at the time of transmission.

A transmission analog signal inputted to an input terminal 210 is converted into a digital signal by an analog/digital converter 121 (indicated by A/D). This signal is multiplexed by a multiplexer 120 (indicated by MUX), together with a preamble signal Po and postamble signals P1, P2, and the multiplexed signals are then inputted to a modulator 119 (indicated by MOD), wherein they are modulated. The modulated wave signals perform amplification, frequency conversion and so on, and are inputted through a transmitting circuit 118 (indicated by TX) to a switching circuit 112-2.

As described previously, the preamble signal Po and the information signal DATA are transmitted from the antenna that is determined by the antenna-selection control signal C that has been stored in the control circuit 117, while the postamble signals P1 and P2 are respectively transmitted from the transmitting antennae 110a and 110b in a predetermined sequence. For example, after the signal P1 is transmitted from the transmitting antenna 110a, the signal P2 is transmitted from the transmitting antenna 110b. In order to provide a cycle for this, the multiplexer 120 outputs a control signal to the control circuit 117. The preamble signal Po is a signal for normal clock playback or carrier playback. As long as the postamble signals P1 and P2 can be used in the measurement of reception signal levels, they can be any signals, for example, carrier signals that are not demodulated.

FIG. 8 is a block diagram of a transmission and reception equipment of a mobile station according to the present invention. The reception signal that was received to an antenna 130 and passed through an antenna shared unit 131 (indicated by DUP) is inputted to a receiving circuit 132 (indicated by RX) which performs frequency conversion, band limit, amplification and so on. A portion of the output of the receiving circuit 132 is demodulated and discriminated in a demodulating circuit 133 (indicated by DEM), and then separated into a preamble signal, an information signal and a postamble signal by a demultiplexer 134 (indicated by DMX).

The information signal is inputted to a digital/analog converter 135 indicated by D/A), and an analog voice signal is obtained in an output terminal 550. According to the postamble signals P1 and P2, the demultiplexer 134 outputs a control signal to a control circuit 136 (indicated by CONT), which measures the output signal levels of the receiving circuit 132.

The control circuit 136 compares the reception levels measured corresponding to the postamble signals P1 and P2, and assigns the postamble signal higher in reception level. That is, a signal that assigns an antenna from which the postamble signal of higher reception level is transmitted is stored as an antenna-selection control signal.

A transmission analog voice signal inputted to an input terminal 600 is converted into a digital signal by an analog/digital converter 140 (indicated by A/D), and then multiplexed by a multiplexer 139 (indicated by MUX), together with a preamble signal and the antenna-selection control signal stored in the control circuit 136, and outputted to a modulating circuit 138 (indicated by MOD).

The output of the modulating circuit 138 is inputted to a transmitting circuit 137 (indicated by TX) which performs amplification, frequency conversion and the like, and transmitted through the antenna shared unit 131 from the antenna 130.

As described above, in the present invention shown in FIGS. 5-8, the transmission to the mobile station from the base station is a transmitting-antenna switching diversity method.

In the present invention shown in FIGS. 5-8, even if a transmitting antenna is selected in accordance with the measurement result transmitted from the mobile station, reduction in diversity effect can be neglected, since the signal frame length is sufficiently short.

While certain representative embodiments and details have been shown for the purpose of illustrating the invention, it will be apparent to those skilled in this art that various changes and modifications may be made therein without departing from the scope of the invention.

What I claim is:

1. In an antenna-selection diversity transmission and reception equipment which is in digital communication with a transmission and reception equipment having a single antenna, and performs transmission and reception with time division by using the same radio frequencies, said antenna-selection diversity transmission and reception equipment comprising:
   a plurality of antennae for receiving frame signals from said transmission and reception equipment having a single antenna, each of said frame signals being constituted by at least a preamble signal, an information signal and a postamble signal;
   a receiving part having receiving means for detecting signal levels of the received frame signals and comparing means for generating antenna selection information by comparing the detected signal levels, said antenna selection information being generated at the time at least said postamble signal was received; and
   a transmitting part having memory means for storing said antenna selection information transmitted by said comparing means of said receiving part; and
   means to select an antenna for transmission from said plurality of antennae at the time of transmission in accordance with said antenna selection information of said memory means.

2. An antenna-selection diversity transmission and reception equipment as set forth in claim 1, wherein said antenna-selection diversity transmission and reception equipment is provided in a base station, and said transmission and reception equipment having a single antenna is provided in a mobile station.

3. A diversity transmission and reception equipment which performs digital communications with a transmission and reception equipment having a plurality of antennae and transmitting a frame signal including at least a first signal interval which is transmitted from one antenna selected from said plurality of antennae and a second signal interval which is transmitted with time division from said plurality of antennae in a predetermined sequence, comprising:
   a single antenna for receiving said frame signal;
   a receiving part for receiving each of signals of said second signal interval transmitted from said plurality of antennae and received to said single antenna, the receiving part having level comparing means for detecting a signal of highest level from said received signals of said second signal interval and transmitting said signal of highest level as a selection control signal; and
   a transmitting part having a selection-control-signal transmitting part to which said selection control signal is inputted, the selection control signal being transmitted through said single antenna to said transmission and reception equipment having a plurality of antennae.

4. A diversity transmission and reception equipment as set forth in claim 3, wherein said diversity transmission and reception equipment is provided in a mobile station, and said transmission and reception equipment having a plurality of antennae is provided in a base station.

5. In a diversity transmission and reception method wherein digital communications are performed between first transmission and reception equipment having a plurality of antennae and second transmission and reception equipment having a single antenna, the improvement wherein said diversity transmission and reception method comprises:
   transmitting a frame signal from said first transmission and reception equipment, the frame signal including at least a first signal interval which is transmitted from one antenna selected from said plurality of antennae and a second signal interval which is transmitted with time division from said plurality of antennae in predetermined sequence;

discriminating signals of said second signal interval of said frame signal transmitted from said first transmission and reception equipment, by said second transmission and reception equipment, and transmitting a signal most satisfactory among said signals of said second signal interval, as a selection control signal from said second transmission and reception equipment;

selecting an antenna for reception from said plurality of antennae of said first transmission and reception equipment by diversity antenna selection, and selecting an antenna for transmission from said plurality of antennae of said first transmission and reception equipment by reception of said selection control signal transmitted from said second transmission and reception equipment.

6. A diversity transmission and reception method as set forth in claim 5, wherein said second signal interval of said frame signal is provided after said first signal interval.

7. A diversity transmission and reception method as set forth in claim 5, wherein said first transmission and reception equipment having a plurality of antennae is provided in a base station, and said second transmission and reception equipment having a single antenna is provided in a mobile station.

* * * * *